3,316,334
CLAY CALCINING PROCESS
Nicholas Walen, Jr., Brooklyn, and Warren C. Schreiner, East Norwich, N.Y., assignors to Pullman Incorporated, a corporation of Delaware
Filed Feb. 26, 1962, Ser. No. 175,546
2 Claims. (Cl. 263—53)

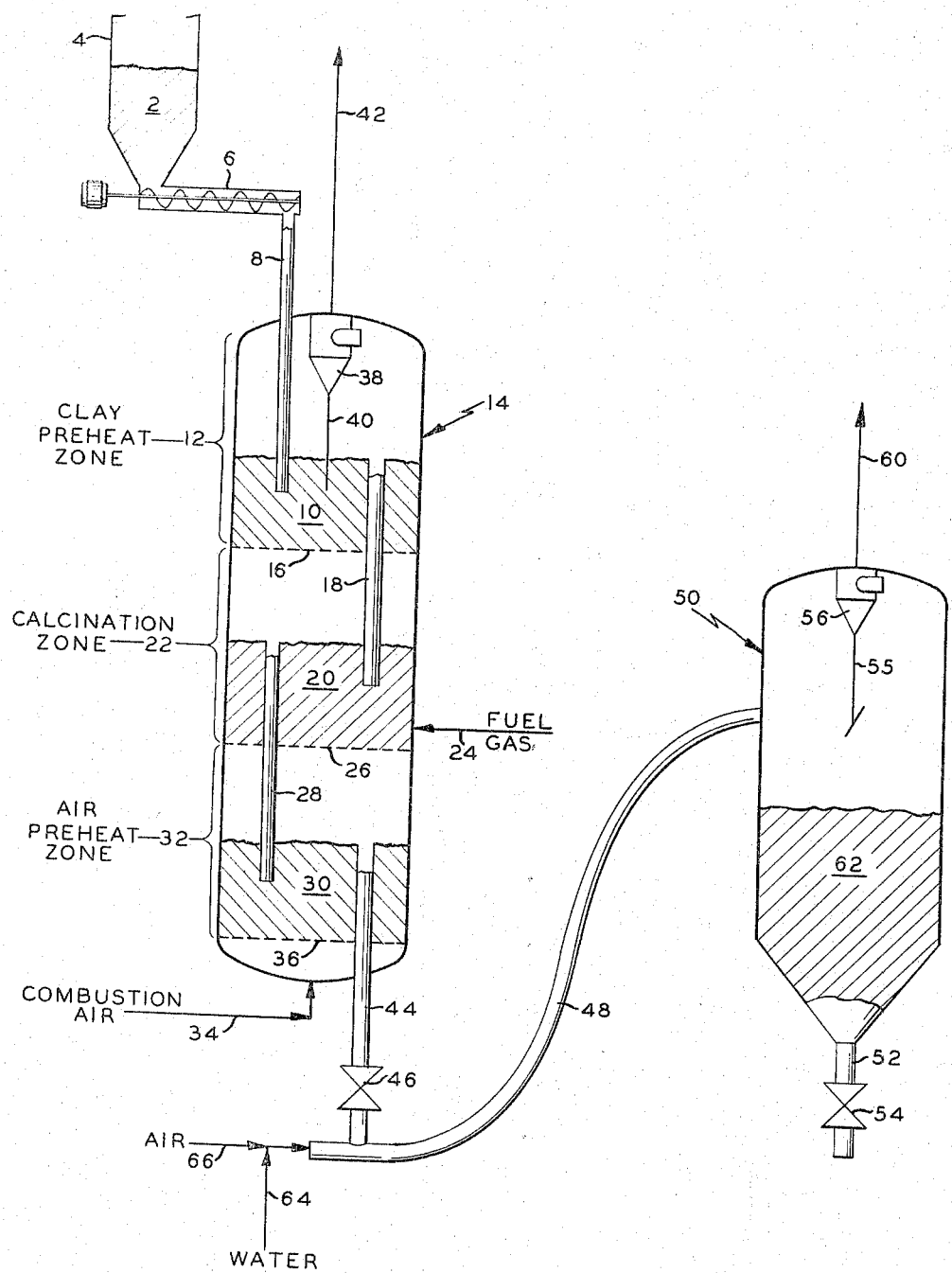

This invention relates to a method of treating clay and shale like materials employed in the structural and refractory industries. In a more specific aspect the invention is directed to the method of obtaining a cooled calcined clay product material comprising ceramic clays and shales.

The fluidized bed technique for contacting finely divided solid particle material with gasiform material has been applied to a number of high temperature, non-catalytic, gas-solids contacting processes including production of lime, cement, pyrite burning and roasting of ores, among others. The fluidized bed technique is particularly advantageous since the suspension contains a relatively high concentration of solids per unit volume, the solids are in a highly turbulent condition resembling a boiling liquid, thereby providing a relatively uniform temperature throughout the fluid bed and contributing to a more uniform treatment in a relatively short time.

It is an object of this invention to calcine clays and shales employing the fluidized bed technique.

Another object of this invention is directed to the method of cooling the hot calcined material.

Other objects and advantages of this invention will become more apparent from the following description.

Clays and shales are complex hydrous silicates of aluminum which are used as raw materials for the structural clay and refractory industries. Because of the nature of contained impurities in the clay, the type of clay and moisture content, pretreatment of the clays and shales is required to facilitate processes including grinding, forming, drying and firing. Accordingly, clays and shales may be pretreated in various ways including drying, calcining, roasting and bloating. Of these pretreatment steps, the present invention is particularly concerned with that having to do with calcination and the recovery of a cooled calcined product therefrom.

Clays naturally contain excess moisture, including water of hydration, as well as combustible substances. During calcination, the raw clay or shale material is exposed to relatively high calcination temperatures to remove moisture and water of crystallization, burn combustible substances included therein and decompose carbonates, sulfates and sulfide impurities therein. The degree of calcination is dependent therefore upon the nature of the material treated, the temperature and the time of exposure to elevated calcination temperatures. Most clays and shales lose their water of hydration at temperatures in the range of from about 300° F. to about 1100° F., carbon constituents are usually burned at temperatures up to about 1650° F. and carbonates, sulfates (except calcium sulfate) and sulfides are decomposed at temperatures in the range of from about 700° F. to about 1850° F. Calcination conditions are therefore dependent upon the chemical characteristics of the material treated and the product desired.

In accordance with this invention, solid clay type particle material of a fluidizable particle size is calcined with an oxygen-containing gas in a fluidized bed condition in a calcining zone, the calcined particle material is recovered at an elevated temperature above about 650° F. as a downwardly moving pressure developing column of calcined material which is cooled to a temperature below 650° F., but not substantially below 300° F. by direct contact with a vaporizable fluid to form a suspension of cooled, calcined material which is passed through a transfer zone to the upper portion of a collection zone positioned adjacent to the calcining zone.

Clays and shales may be successfully handled and calcined in a fluid bed system provided the particle size of the material is within a range of from about 10 to about 450 mesh, preferably from about 20 to about 325 mesh and employing superficial gas velocities in the range of from about 0.3 to about 3 feet per second, preferably below about 2 feet per second. Accordingly, in the preferred method of this invention a plurality of subjacent and interconnected relatively dense fluid beds of the solid particle material are maintained for the solid clay particle material to move sequentially therethrough and generally countercurrent to oxygen-containing gaseous material or gaseous combustion products thereof. Preferably, the solid particle material moves generally downwardly from bed to bed through suitable interconnecting standpipes, while the gaseous material passes upwardly and sequentially through the plurality of subjacent fluid beds of solid particle material maintained in a single vessel.

In the preferred method and arrangement of process steps of this invention, the solids to be calcined are first preheated in one or more upper fluidized beds of solid particle material in a solids preheat zone with hot effluent combustion gas obtained from a lower calcining zone and thereafter the preheated solids are transferred by gravity through a standpipe from the upper preheat zone to a subjacent fluidized bed of solids in a calcining zone maintained therebelow and under elevated temperature calcining conditions by burning of a suitable fuel introduced thereto with preheated oxygen-containing combustion gas obtained as hereinafter described. Calcining of the solid material is affected at a temperature above about 1000° F., preferably at a temperature of about 1500° F. The calcined solids are transferred by gravity through a standpipe from the calcining zone to a subjacent fluidized bed of calcined solids or combustion air preheat zone for partial cooling of the solids by direct heat exchange with oxygen-containing combustion gases introduced to the lower portion of the fluid bed of solids, thereby preheating the oxygen-containing combustion gases to an elevated temperature suitable for introduction into the calicination zone thereabove. Although the fluidized bed of solids in the solids preheating step, calcining step and combustion gas preheat step may be maintained in separate contact zones either above one another or by the side of one another, it is preferred that a single unitary reactor design containing a plurality of superimposed fluid beds of solids and interconnecting standpipes or transfer conduits therebetween be employed, since such an arrangement is economically and thermodynamically more efficient.

The calcined solids partially cooled in the combustion air preheat zone to a temperature below about 1000° F. and preferably in the range of from about 650° F. to about 900° F., are withdrawn by gravity from the combustion air preheat zone through a standpipe provided with a flow control valve in the lower end thereof. The partially cooled solids in the standpipe at an elevated temperature above 650° F. require additional cooling before passing to storage or handling in the preparation of desired ceramic materials. In accordance with this invention, final cooling of the calcined solids withdrawn from the combustion air preheat zone is accomplished by discharging the withdrawn and partially cooled solids in direct contact with a vaporizable fluid in a transfer conduit connecting the bottom of the standpipe with the upper portion of an adjacent storage hopper. By this method and arrangement of process steps, the vaporizable fluid cools the calcined solids to a temperature below 650° F. and provides the suspension medium for passing the solids through the transfer conduit and discharge into the upper portion of the storage hopper. More specifically, the hot calcined solids discharged from the standpipe under an elevated hydrostatic pressure are combined in the transfer conduit with a vaporizable fluid such as water alone or water combined with gaseous material such as air or steam in an amount sufficient to further cool the calcined solids to a low temperature of about 300° F. and suitable for direct introduction into a storage hopper. Accordingly, the transfer conduit serves the dual function of a cooling zone in conjunction with a solids transport zone. It is preferred, in accordance with this invention, to maintain the temperature of the transfer conduit and calcined solids therein above the dew point of the fluid introduced therefor, for example, at a temperature above about 250° F. When using water alone as the cooling fluid, complete vaporization of the water by the hot solids should be effected to assure a relatively dry transfer of the solid suspension through the transfer conduit. It is contemplated, however, within the scope of this invention of maintaining lower temperatures within the transfer conduit, but not sufficiently low to cause agglomeration, caking or sticking of the calcined solids due to wetting of the solids, since it has been found that a small amount of adsorbed water or incompletely vaporized water may be tolerated without detrimentally effecting the calcined material or forming undesired water of crystallization in the calcined solid. Accordingly, during the combined cooling transfer step the partially cooled calcined solid material depending on the temperature thereof generates all or at least a major portion of the necessary fluidizing medium required in the transfer conduit. Accordingly, employing the improved and novel method of this invention, a substantial reduction in the amount of air required to cool the calcined solids to a desired low temperature is realized in addition to completely eliminating the cumbersome and expensive equipment hereinbefore employed.

Having thus given a general description of the improvements of this invention, reference is now had to the drawing, by way of example, for a better understanding thereof.

Referring now to the drawing, raw ceramic clay material 2 maintained in hopper 4 is passed to a clay preheat zone 12 in the upper portion of reactor zone 14 by a solids feed device comprising a screw conveyor 6 connected to a standpipe 8. Standpipe 8 extends downwardly from screw conveyor 6 into the preheat zone 12 a distance sufficient to discharge in the lower portion thereof and beneath the upper level of a dense fluid bed of clay material 10 maintained therein. In preheat zone 12 the finely divided raw clay particles of a fluidizable particle size are heated to an elevated temperature of about 600° F., while being maintained in a fluidized condition by hot flue gases passing upwardly therethrough and obtained from the calcining step hereinafter described beneath distributor grid 16. The flue gases of reduced temperature leaving the upper portion of fluid bed 10 pass through one or more suitable cyclone separators 38 for separation and recovery of entrained finely divided clay particles from the flue gases. The separated clay particles or solids recovered in cyclone separator 38 or returned by dipleg 40 to fluid bed 10 therebelow and the flue gases denuded of entrained fines are removed from the upper portion of the reactor by conduit 42. The clay solids preheated in fluid bed 10 overflow from the upper portion of the bed into an open end standpipe 18 extending downwardly through the bed and grid 16 into the lower portion of a subjacent fluid bed of clay solids 20 maintained in a calcining zone 22 within reactor 14. As in the solids preheat zone the solids discharge into the lower portion of the fluid bed of solids 20 maintained in the calcining zone. In calcining zone 22, the fluid bed of clay solids is preheated to an elevated calcining temperature of about 1500° F. by combustion of a suitable fuel gas introduced directly into and preferably in the lower portion of fluid bed 20. Combustion of the fuel gas introduced by conduit 24 to bed 20 and above grid 26 is supported by preheated combustion air passing upwardly through grid 26 which serves, in addition, as the fluidizing medium for the bed of solids in calcining zone 22. A third open end standpipe 28 extends downwardly from the upper portion of fluid bed 20 into the lower portion of a subjacent fluid bed 30 maintained in a combustion air preheat zone 32 within the lower portion of reactor 14 so that the calcined clay solids will flow by gravity from the upper portion of bed 20 into the lower portion of bed 30. In preheat zone 32 combustion air introduced to the bottom of reactor 14 by conduit 34 passes upwardly through distributor grid 36 as the fluidizing medium for the bed of hot calcined clay solids in bed 30. In passing through fluid bed 30 the combustion air is preheated by direct heat exchange to a temperature of about 800° F., while simultaneously cooling the calcined clay to about the same temperature. Thereafter the preheated air passes upwardly through distributor grid 26 into the calcining zone as hereinbefore discussed.

In the reactor arrangement described above, the clay solids moves generally downwardly and countercurrent to ascending gasiform material introduced to the bottom of the reactor. In this arrangement, it is to be understood that one or more separate fluid beds of solids with suitable interconnecting standpipes may be maintained in each of the clay preheat zone 12, calcining zone 22 and air preheat zone 32 in order to obtain desired contact of the solids with gasiform material.

The calcined clay solids partially cooled to a temperature of about 800° F. by direct contact or heat exchange with introduced combustion air in zone 32 is withdrawn from the upper portion of fluid bed 30 by a downwardly extending standpipe 44 provided with a flow control valve 46 at the lower end thereof. To effect further cooling of the withdrawn clay solids in standpipe 44 the solids are discharged from the base thereof into a transfer conduit 48 interconnecting the base of standpipe 44 with the upper portion of an adjacently positioned storage hopper 50. Standpipe 44 is of a length sufficient for the solids therein to develop a hydrostatic pressure at the base thereof to transfer the solids in admixture with a fluidizing medium to the upper portion of the adjacently positioned storage hopper. As a fluidizing medium in addition to effecting further desired cooling of the hot calcined clay solids, water is introduced by conduit 64 to the lower end of transfer conduit 48, either with or without a quantity of air introduced by conduit 66, and in an amount so that upon contact with the hot solids the introduced water will be substantially immediately vaporized to form a solids vapor suspension having a temperature above the dew point of the water at the pressure existing in transfer conduit 48. The thus formed suspension of substantially reduced temperature passes through transfer conduit 48 for discharge in the upper portion and above a bed of calcined clay 62 maintained in storage hopper 50. In the arrangement herein described the hopper is also maintained at a slightly elevated temperature and above the dew point of water, preferably at a temperature of about 300° F. The suspension, upon discharge into the upper portion of hopper 50 is substantially immediately separated due to a change in the velocity of the suspension with the solids separating out by settling and falling on to the top of bed 62. The fluidizing medium comprising water vapor either with or without air passes through one or more cyclone separators 56 provided with a dipleg 55 for separation and recovery of entrained solids from the fluidizing medium before withdrawing the fluidizing medium from the hopper by conduit 60. Dipleg 58 extending downwardly from cyclone separator 56 terminates above the upper level of bed 62 and is provided at the bottom end thereof with a suitable normally closed valve which will prevent flow of gaseous material upwardly through the dipleg, maintain a predetermined column height of separated solids within the dipleg as a seal against gas flow therethrough, but which will automatically open and discharge solids from the dipleg with a predetermined height of solids extended in the dipleg, thereby returning separated solids from cyclone separator 56 to the bed of solids 62. Extending downwardly from the bottom of hopper 50 is conduit 52 provided with valve 54 for withdrawing relatively cool and calcined clay solids for further use as required in structural and ceramic industries.

It can be seen from the above description that applicants have provided a novel, efficient and an economical process for the production of calcined clay material which overcomes any of the disadvantages of the prior art. Although one specific arrangement of process equipment has been specifically shown and described by way of example, it is to be understood that no undue restrictions are to be imposed by reason thereof, since many changes and modifications may be made thereto without departing from the scope and spirit of the invention.

We claim:

1. In a method for calcining clay type material in which particles of such material are treated by means of fluidizing combustion supporting gas at a suitable calcining temperature in a calcination zone, and calcined particles are employed to preheat said combustion supporting gas by contact therewith in a fluid bed of such particles which are thereby cooled to an elevated temperature below the calcination temperature in a particle cooling zone, the improvement which comprises: withdrawing partially cooled calcined material at about the temperature of said particle cooling zone as a hydrostatic pressure developing column of calcined material, discharging the column of calcined material into a confined, elongated transfer zone, contacting said material immediately upon discharge with liquid water thereby vaporizing said water to form a suspension of steam and calcined particles at a reduced temperature, and employing the expansion energy of the vaporizing water to flow said suspension through said transfer zone to a solids-gas separating zone without supplying further energy thereto.

2. The method of claim 1 in which said material discharged from said pressure developing column is contacted immediately upon discharge into said transfer zone with water to effect cooling of said particles to a temperature between about 650° F. and about 300° F.

References Cited by the Examiner

UNITED STATES PATENTS

| | | | |
|---|---|---|---|
| 2,498,710 | 2/1950 | Roetheli | 263—21 |
| 2,607,199 | 8/1952 | Christensen | 34—20 X |
| 2,867,429 | 1/1959 | Heath | 263—21 |

FREDERICK L. MATTESON, Jr., *Primary Examiner.*

JOHN J. CAMBY, SAMUEL H. BLECH, JOBIAS E. LOVOW, *Examiners.*

S. E. MOTT, *Assistant Examiner.*